(12) United States Patent
Singleton, IV et al.

(10) Patent No.: US 11,115,478 B2
(45) Date of Patent: Sep. 7, 2021

(54) COMPUTER SYSTEM AND METHODS PROVIDING VIRTUAL COMPUTING SESSION CONNECTIONS AND RE-DIRECTS BASED UPON ORDERED LIST OF VIRTUAL DELIVERY AGENTS

(71) Applicant: CITRIX SYSTEMS, INC., Fort Lauderdale, FL (US)

(72) Inventors: Leo C. Singleton, IV, Fort Lauderdale, FL (US); Georgy Momchilov, Parkland, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/194,823

(22) Filed: Nov. 19, 2018

(65) Prior Publication Data
US 2020/0162560 A1 May 21, 2020

(51) Int. Cl.
*H04L 29/08* (2006.01)
*G06F 9/451* (2018.01)
*G06F 9/455* (2018.01)

(52) U.S. Cl.
CPC .............. *H04L 67/14* (2013.01); *G06F 9/452* (2018.02); *G06F 9/45558* (2013.01); *H04L 67/32* (2013.01); *G06F 2009/4557* (2013.01)

(58) Field of Classification Search
CPC ......... H04L 67/14; H04L 67/32; G06F 9/452; G06F 9/45558; G06F 2009/4557
See application file for complete search history.

(56) References Cited

U.S. PATENT DOCUMENTS 7,724,657 B2  5/2010  Rao et al.
8,141,075 B1  3/2012  Chawla et al.
(Continued)

FOREIGN PATENT DOCUMENTS

WO   WO2008011314   1/2008

OTHER PUBLICATIONS

Georgy Momchilov "HDX Adaptive Transport and EDT: ICA™ s New Default Transport Protocol (Part II)" https://www.citrix.com/blogs/2017/11/20/hdx-adaptive-transport-and-edt-icas-new-default-transport-protocol-part-ii; Nov. 20, 2017; pp. 7.
(Continued)

*Primary Examiner* — John A Follansbee
*Assistant Examiner* — Raqiul A Choudhury
(74) *Attorney, Agent, or Firm* — Allen, Dyer, Doppelt + Gilchrist, PA (57) ABSTRACT

A computer system may include at least one client computing device, and a plurality of host computing devices each configured to provide virtual computing sessions for the at least one client computing device. Each host computing device may have a virtual delivery agent (VDA) associated therewith configured to connect the at least one client computing device with the virtual computing sessions. The at least one client computing device may be configured to request virtual computing sessions from the VDAs in accordance with an ordered list of the VDAs. The VDAs may be configured to re-direct new session requests from the at least one client computing device to a lower VDA in the ordered list when an existing virtual computing session is already active with the host computing device associated with the lower VDA.

20 Claims, 11 Drawing Sheets (56) References Cited

U.S. PATENT DOCUMENTS

| | | | | |
|---|---|---|---|---|
| 8,190,676 | B2* | 5/2012 | Momchilov | H04L 67/10 |
| | | | | 709/203 |
| 8,555,274 | B1* | 10/2013 | Chawla | G06F 9/5077 |
| | | | | 718/1 |
| 8,800,009 | B1* | 8/2014 | Beda, III | H04L 63/0846 |
| | | | | 713/155 |
| 9,009,327 | B2 | 4/2015 | Adhya et al. | |
| 9,021,475 | B2 | 4/2015 | Nimmagadda et al. | |
| 9,176,744 | B2 | 11/2015 | Lee | |
| 9,426,227 | B2 | 8/2016 | Bell | |
| 9,538,345 | B2 | 1/2017 | Sah et al. | |
| 2008/0295096 | A1* | 11/2008 | Beaty | G06F 9/5077 |
| | | | | 718/1 |
| 2011/0153716 | A1 | 6/2011 | Malakapalli et al. | |
| 2013/0219468 | A1 | 8/2013 | Bell | |
| 2013/0318102 | A1* | 11/2013 | Fontignie | H04L 67/2842 |
| | | | | 707/748 |
| 2014/0115028 | A1* | 4/2014 | Taylor | H04L 67/141 |
| | | | | 709/202 |
| 2014/0254546 | A1* | 9/2014 | L'Heureux | H04L 67/306 |
| | | | | 370/331 |
| 2014/0365665 | A1* | 12/2014 | Backholm | H04L 41/0893 |
| | | | | 709/226 |
| 2015/0350101 | A1* | 12/2015 | Sinha | G06F 9/00 |
| | | | | 709/226 |
| 2016/0330288 | A1* | 11/2016 | Hoffman | H04L 67/10 |
| 2016/0373520 | A1* | 12/2016 | Kumar | H04L 67/1002 |
| 2019/0278928 | A1* | 9/2019 | Rungta | G06F 9/5077 |
| 2020/0076806 | A1* | 3/2020 | Nassar | H04L 63/102 |

OTHER PUBLICATIONS

U.S. Appl. No. 16/241,047, filed Jan. 7, 2019 Singleton et al.

* cited by examiner

COMPUTER SYSTEM AND METHODS PROVIDING VIRTUAL COMPUTING SESSION CONNECTIONS AND RE-DIRECTS BASED UPON ORDERED LIST OF VIRTUAL DELIVERY AGENTS

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

SUMMARY

A computer system may include at least one client computing device, and a plurality of host computing devices each configured to provide virtual computing sessions for the at least one client computing device. Each host computing device may have a virtual delivery agent (VDA) associated therewith configured to connect the at least one client computing device with the virtual computing sessions. The at least one client computing device may be configured to request virtual computing sessions from the VDAs in accordance with an ordered list of the VDAs. The VDAs may be configured to re-direct new session requests from the at least one client computing device to a lower VDA in the ordered list when an existing virtual computing session is already active with the host computing device associated with the lower VDA.

In an example implementation, the at least one client computing device may comprise a plurality of client computing devices each having a respective user account associated therewith, and client computing devices having a same user account associated therewith may share a same ordered list of the VDAs. Furthermore, the at least one client computing device may be configured to sequentially request virtual computing sessions from the VDAs in the ordered list from a highest order to a lowest order.

Additionally, each VDA may be configured to notify VDAs higher in the ordered list upon connecting the at least one client computing device with a virtual computing session. Moreover, each VDA may also be configured to notify VDAs higher in the ordered list upon closing of a virtual computing session with the at least one client computing device.

In an example embodiment, the system may further include a gateway computing device configured to receive requests for virtual computing sessions from the at least one client computing device, and communicate with the VDAs to establish virtual computing sessions for the at least one client computing device in accordance with the ordered list. Moreover, the at least one client computing device may be configured to provide the ordered list to the gateway computing device. In addition, gateway computing device may also be configured to re-direct new session requests from the at least one client computing device to a lower VDA in the ordered list when an existing virtual computing session is already active with the host computing device associated with the lower VDA and without notifying the at least one client computing device of the re-direct.

In another example implementation, the system may further include a broker computing device cooperating with the VDAs to track active virtual computing sessions between the host computing devices and the at least one client computing device. In still another example, a broker computing device may re-direct new session requests from the at least one client computing device to another VDA inside or outside of the ordered list when a connected-to VDA is unable to connect the at least one computing device with a virtual computing session. By way of example, the virtual computing sessions may comprise at least one of virtual desktop sessions and virtual application sessions.

A related method is for connecting at least one client computing device with virtual computing sessions provided by a plurality of host computing devices each having a VDA associated therewith. The method may include receiving a new session request from the at least one client computing device at a first one of the VDAs for a virtual computing session in accordance with an ordered list of the VDAs. The method may further include, at the first VDA, re-directing the new session request to a second VDA lower in the ordered list when an existing virtual computing session is already active with the host computing device associated with the second VDA.

A related non-transitory computer-readable medium may be for a virtual delivery agent (VDA) associated with a host computing device. The host computing device may be configured to provide virtual computing sessions for at least one client computing device. The non-transitory computer-readable medium may have computer-executable instructions for causing the VDA to perform steps including receiving a new session request for a virtual computing session from the at least one client computing device in accordance with an ordered list of a plurality of different VDAs associated with the at least one client computing device, and when an existing virtual computing session is already active with a host computing device associated a lower VDA in the ordered list, re-directing the new session request to the lower VDA in the ordered list.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout, and prime notation may be used to indicate similar elements in different embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
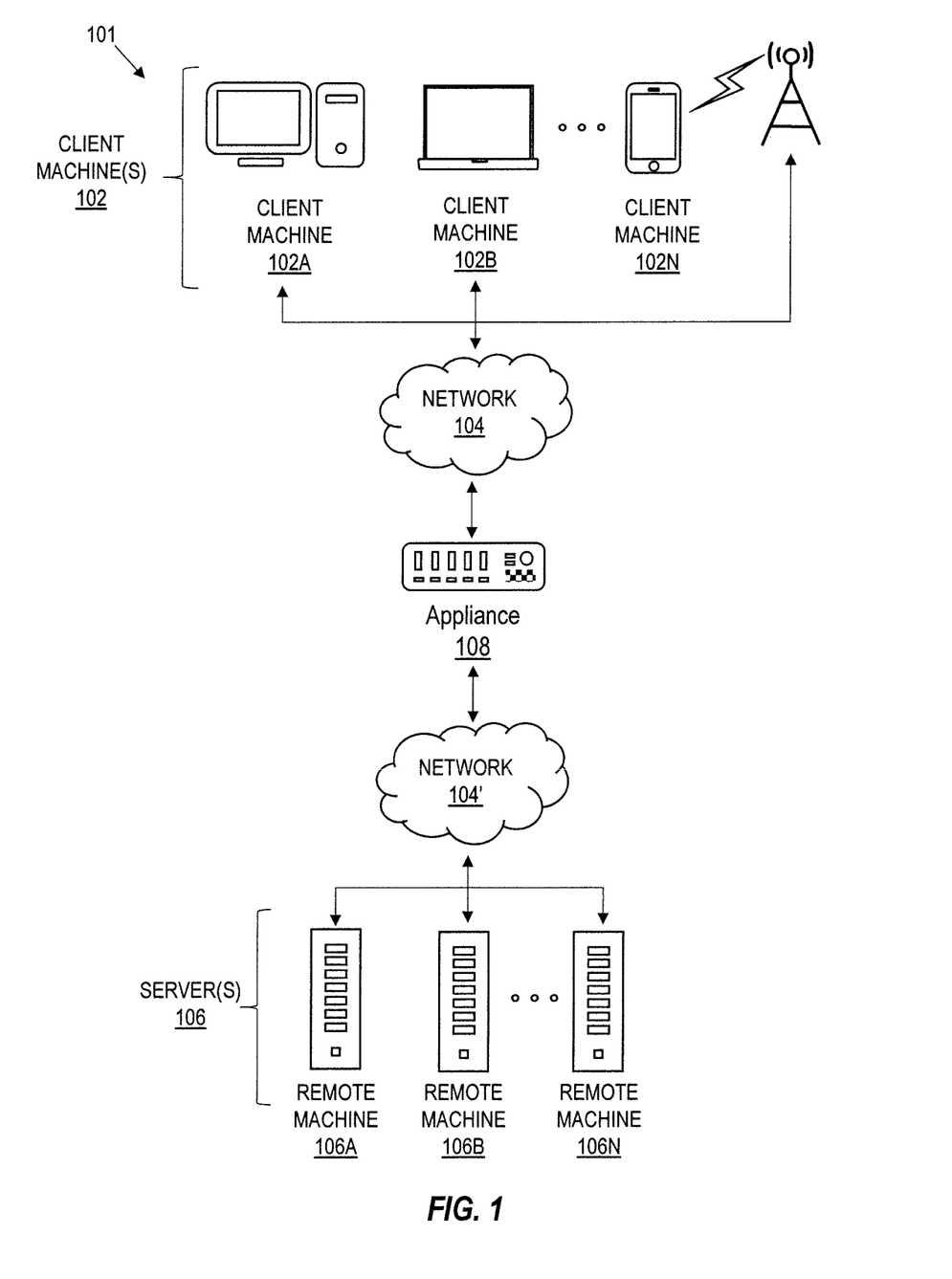
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
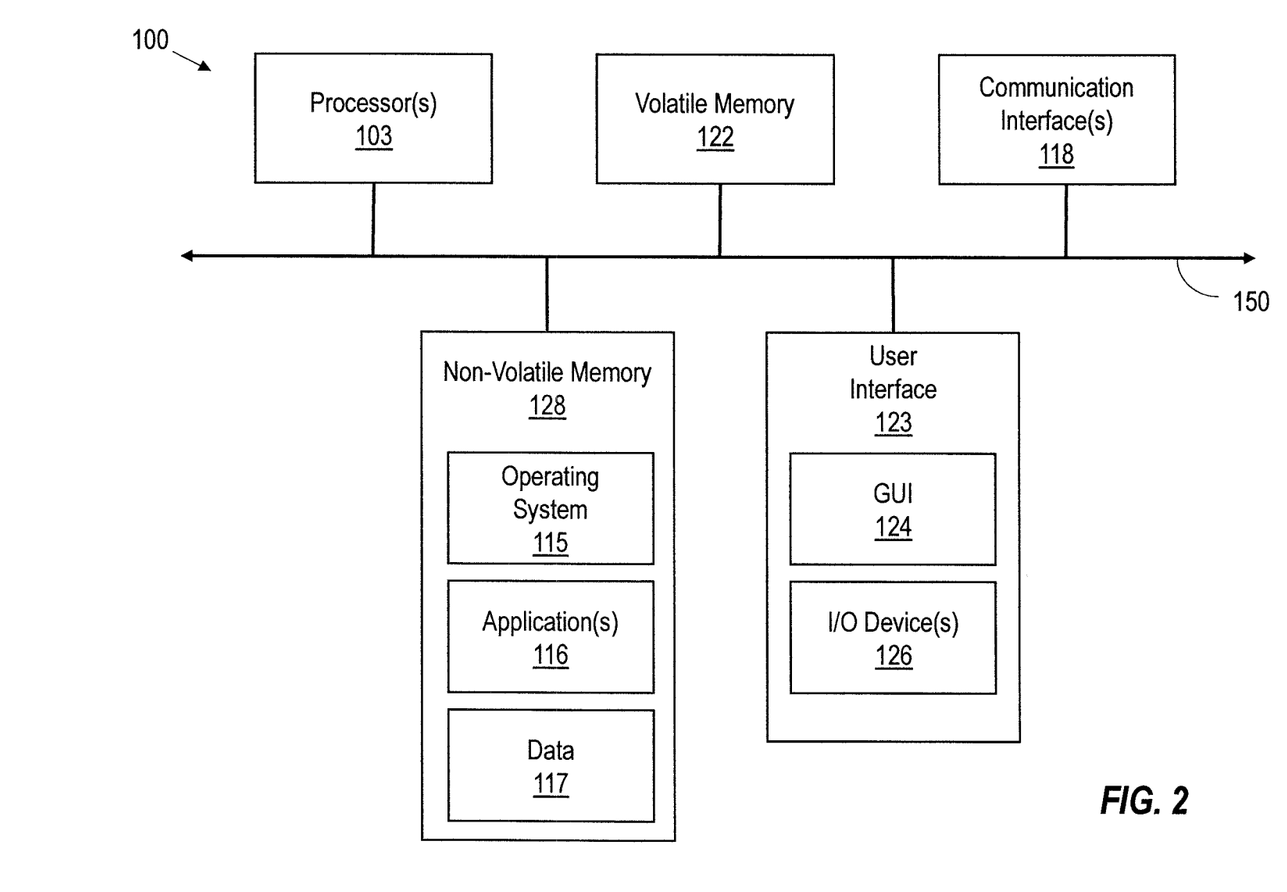
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
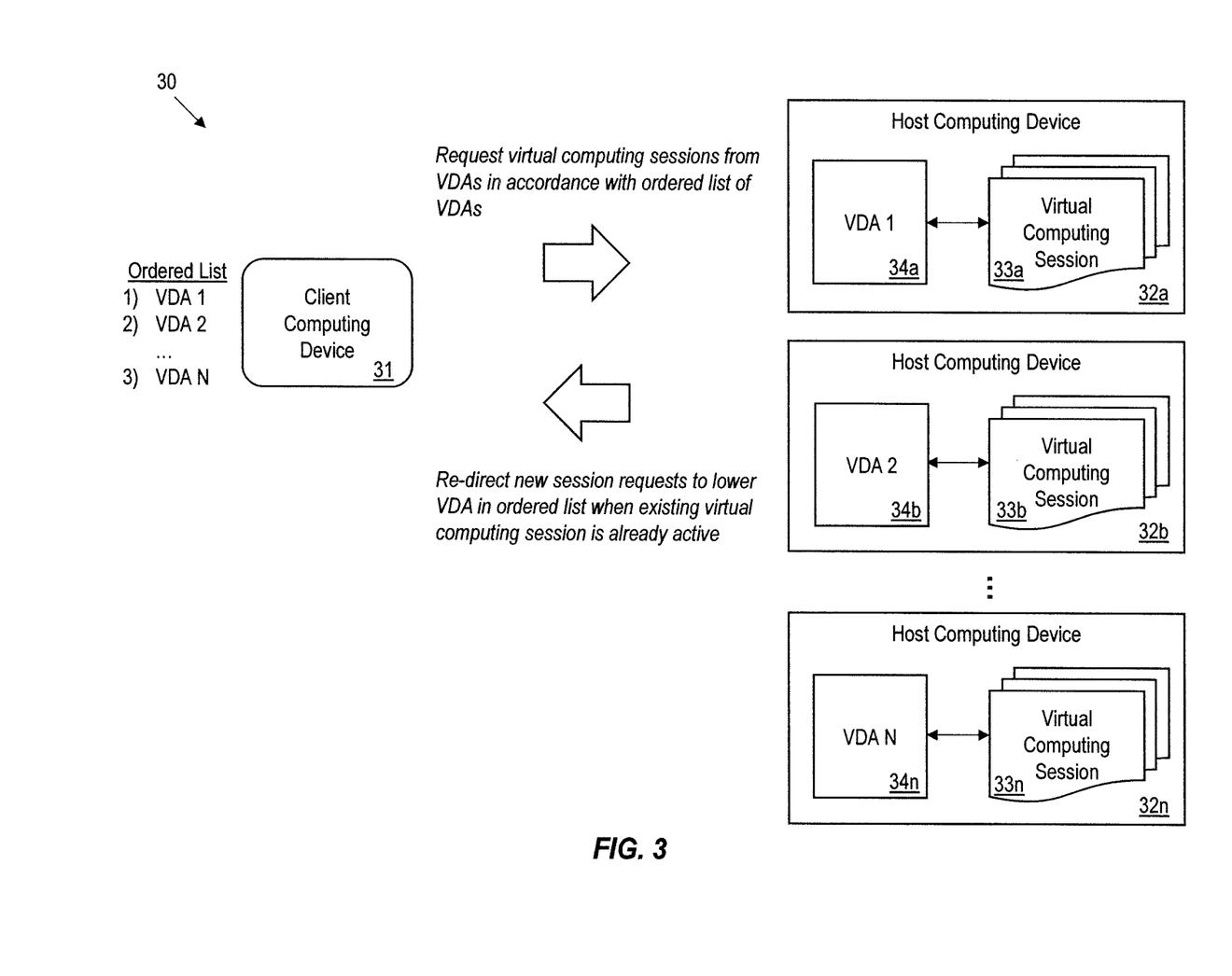
FIG. 3 is a block diagram of a computing system in accordance with an example implementation providing virtual computing session connections and re-directs based upon an ordered list of virtual delivery agents (VDAs).
Figure 10:
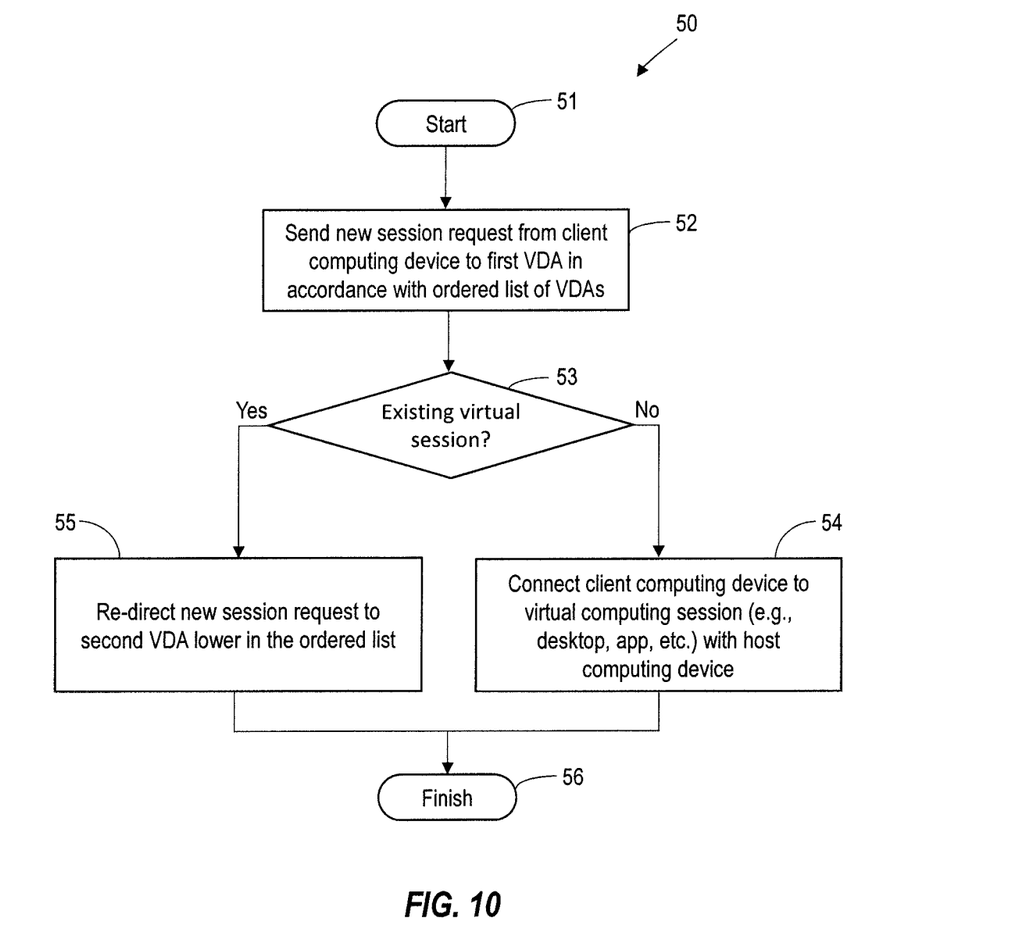
FIG. 10 is a flow diagram illustrating example method aspects associated with the system of FIG. 3.

Turning to FIG. 3 and the flow diagram 50 of FIG. 10, an approach is now described which allows for roaming of virtual computing sessions between different client computing devices without the need for a centralized broker. By way of background, Citrix XENAPP and XENDESKTOP are products which allow client computing devices to remotely access virtual computing sessions, such as virtual desktop sessions and virtual application sessions. By way of example, the virtual application sessions may provide access to shared computing applications, including hosted applications, Web/Software as a Service (SaaS) applications, etc. Virtual desktop sessions may include both shared applications and hosted operating system components. In the case of XENAPP and XENDESKTOP, a Virtual Delivery Agent (VDA) enables connections to the applications and desktops, and is typically installed on the server/machine that runs the XENAPP and/or XENDESKTOP virtual application/desktop sessions for the user (although it may be installed on a different machine in some implementations). The VDA enables the machines to register with delivery controllers and manage the connection to a user device.

As cloud-based implementations of VDI systems continue to increase, so too does the push for higher availability despite outages of the cloud service or internet. However, cloud-based instances of systems such as XENAPP and XENDESKTOP typically rely on a centralized broker to track sessions between the client device and VDAs. This is important because users typically have multiple client devices, and thus when a user has already opened a session with one client device, it is generally desired to roam that existing session to the next user device when the user switches between them. However, with typical configurations, when outages occur and the broker cannot be accessed, a degraded operating state may occur in which multiple different sessions are opened for different client devices associated with the same user.

The computer system 30 illustratively includes one or more client computing devices 31 (e.g., smartphones, tablet computers, laptop computers, desktop computers, etc.), and a plurality of host computing devices 32a-32n (e.g., servers or other appliances) each configured to provide virtual computing sessions 33a-33n for the client computing device(s) as discussed above. In practice, each host computing device 32a-32n may provide virtual computing sessions 33a-33n for numerous different client computing devices, although a single client computing device 31 is shown in FIG. 3 for clarity of illustration. Each host computing device 32a-32n has one or more VDAs 34a-34n associated therewith, which as noted above are configured to connect the client computing device(s) 31 with the virtual computing sessions 33a-33n. In the illustrated example, each VDA 34a-34n is associated with a respective host computing device 32a-32n, but in some embodiments a given VDA may be used to facilitate session connections with multiple host computing devices, i.e., a single VDA could be used with multiple host computing devices if desired. It should be noted that the VDAs 34a-34n and host computing devices 32a-32n may be implemented in the cloud or on premises in different embodiments.

Beginning at Block 51, the client computing device 31 is configured to request virtual computing sessions 33a-33n from the VDAs 34a-34n in accordance with an ordered list of the VDAs. In the illustrated example, the ordered list begins with the first VDA 34a (VDA 1) and ends with the last VDA 34n (VDA N). As such, when requesting a new session, the client computing device 31 would first send the new session request to the VDA 34a (Block 52), and if unable to connect to a session through this VDA it would continue to request a new session from each of the VDAs in the list in descending order until it is connected with a new session.

However, in some instances a virtual computing session may already be active for the user account associated with the client computing device 31, at Block 53. This may be because the session was previously opened through the client computing device 31 and not closed, or it was opened through another client computing device associated with the same user account, as will be discussed further below. Moreover, if the first VDA 34a was down or unavailable when the prior session was created, then this session will be running at one of the other host computing device 32b-32n, and not at the host computing device 32a. That is, the client computing device 31 (or another client computing device associated with the same account) when requesting the prior session would have progressed through the ordered list progressively to the lower-ordered VDAs 34b-34n once it could not connect with the VDA 34a until it ultimately was able to establish a session.

The VDA 34a accordingly not only tracks virtual computing sessions 33a that it establishes, but it may also advantageously track sessions established for the client computing device 31 by VDAs 34b-34n lower in the ordered list. In this way, the VDA 34a will know when such prior virtual computing sessions are already active for a user account when a new session request is received for that same user account. In the case where no prior virtual computing session 33a-33n is active for the user account with any of the host computing devices 32a-32n, then the VDA 34a may accordingly proceed to connect the client computing device with a virtual computing session 33a, at Block 54. However, when the VDA 34a determines that a prior session is already established for the user account associated with the client computing device 31, the VDA 34a would then re-direct the new session request from the client computing device 31 to the appropriate lower VDA 34b-34n in the ordered list, so that the existing session may then be roamed to the client computing device in lieu of establishing a brand new virtual computing session, at Block 55. This concludes the method illustrated in FIG. 10 (Block 56).

Figure 4:
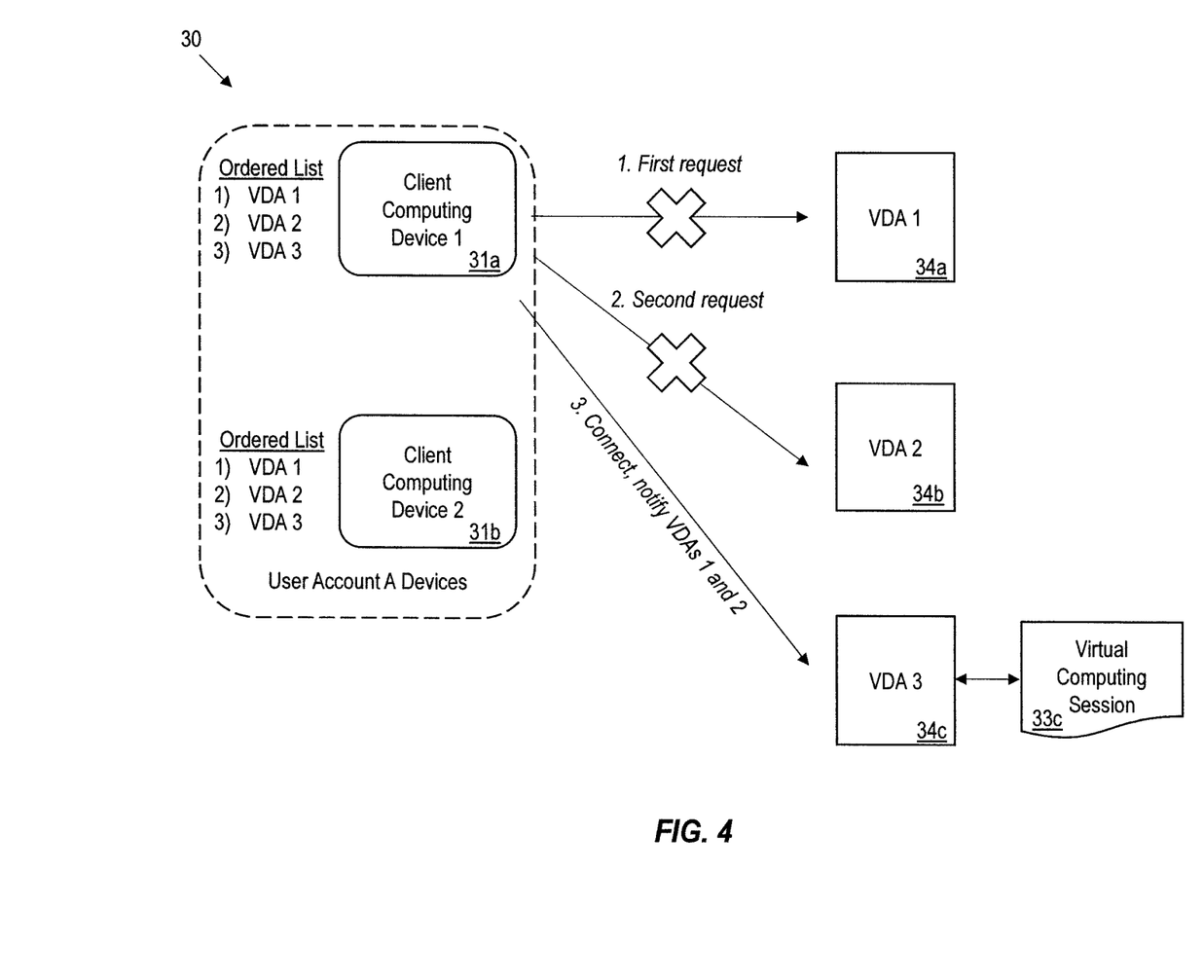
FIGS. 4-6 are a series of block diagrams illustrating virtual computing session connection aspects in accordance with a first example embodiment of the system of FIG. 3.
Figure 5:
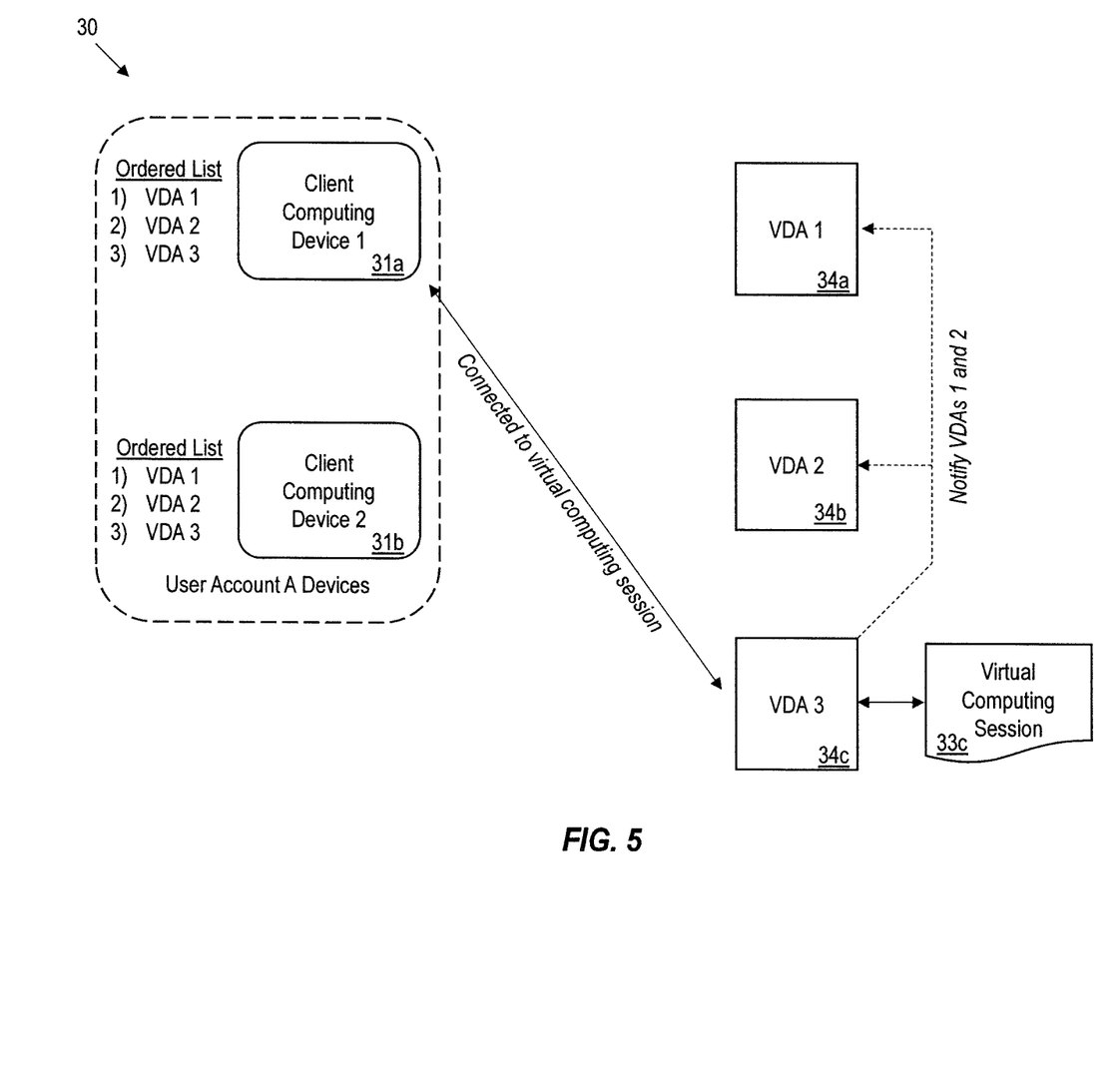
Figure 6:
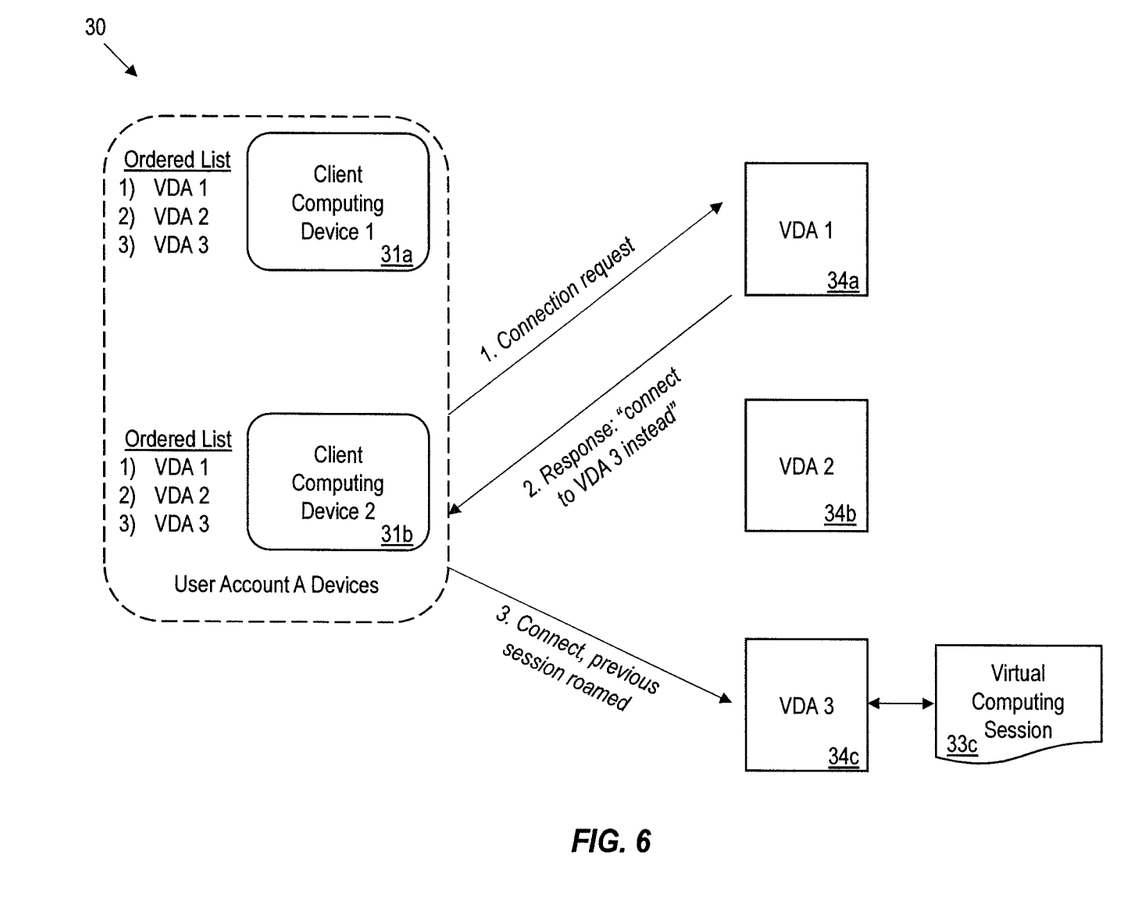

The foregoing will be further understood with respect to example implementations, a first of which is now described with references to FIGS. 4-6. In this example, there are two client computing devices 31a, 31b each associated with a same user account (User Account A), although any number of client computing devices may be associated with a given user account in different embodiments. Furthermore, all of the client devices 31a, 31b receive a same ordered list of VDAs 34a, 34b, 34c to which they are to connect (in that order) for virtual computing sessions. By way of example, this ordered list may be provided by a central broker or cloud service, such as when the client computing devices 31a, 31b register as part of the system 30. However, since the list is stored on the client devices 31a, 31b, uptime of this broker or service is not important. In some embodiments, the list may be specific to a given app or group of apps, if desired, and different lists may be used by the client computing devices 31a, 31b for different applications or groups thereof in some embodiments.

In the illustrated example, at a first time (FIG. 4) the client computing device 31a follows the order of the list to request a new virtual computing session. In this case, the client computing device 31a starts with the first VDA 34a and is unable to connect. The client computing device 31a only proceeds to the next VDA (here the VDA 34b) in the list if the previous one (i.e., the VDA 34a) is down or rejects the connection because it is fully-loaded, etc. In the illustrated example, this happens with both the first and second VDAs 31a, 31b in the list, so the client computing device 31a moves along to the third VDA 34c, to which it is finally able to connect and establish a virtual computing session 33c (note that the host computing device for the virtual computing session 33c is not shown for clarity of illustration).

When a client computing device is connected to a VDA other than the first one in the ordered list, as is the case in this example between the client computing device 31a and the VDA 34c, the client computing device provides the list of the higher-ranked VDAs (here the VDAs 34a, 34b) when establishing the connection. The VDA 34c may store this list in memory, so that it may inform (e.g., on a periodic basis) the higher-ranked VDAs 34a, 34b of the session it holds, e.g., via a peer-to-peer protocol (FIG. 5). It may continue to do so long as that session exists, even if the client computing device 31a disconnects. However, in other implementations, the VDA 34c need not send continuous updates to the other VDAs in the list. For example, the higher-order VDAs could poll the lower-order VDAs before establishing a new session, or the updates may be performed through a broker, as will be discussed further below.

With the virtual computing session 33c already being established for the user account, at a later time (FIG. 6) when the VDA 34a (or any VDA below it in the list) receives a connection request from a client, it first checks the list of notifications it has stored in memory to see if a virtual computing session has already been established for the given user account by another VDA lower in the list. In the present example, the VDA 34a receives a request for a virtual computing session from the second client computing device 31b associated with the user account. The VDA 34a discovers that the virtual computing session 34c was previously established elsewhere by the VDA 34c. As a result, the VDA 34a rejects the connection from the client computing device 31b, and instead informs the client computing device of the existing session's location, re-directing the client computing device to the VDA 34c. Upon receiving the rejection from the VDA 34a due to session 33c already being established elsewhere, the client computing device 31b then makes a second connection to the lower-ranked VDA 34c instead, and the VDA 34c may then roam the existing session to the client computing device 31b. In this way, the prior work/progress already made by the user in the virtual computing session 33c is maintained and becomes readily accessible through the second client computing device 31b.

Figure 7A:
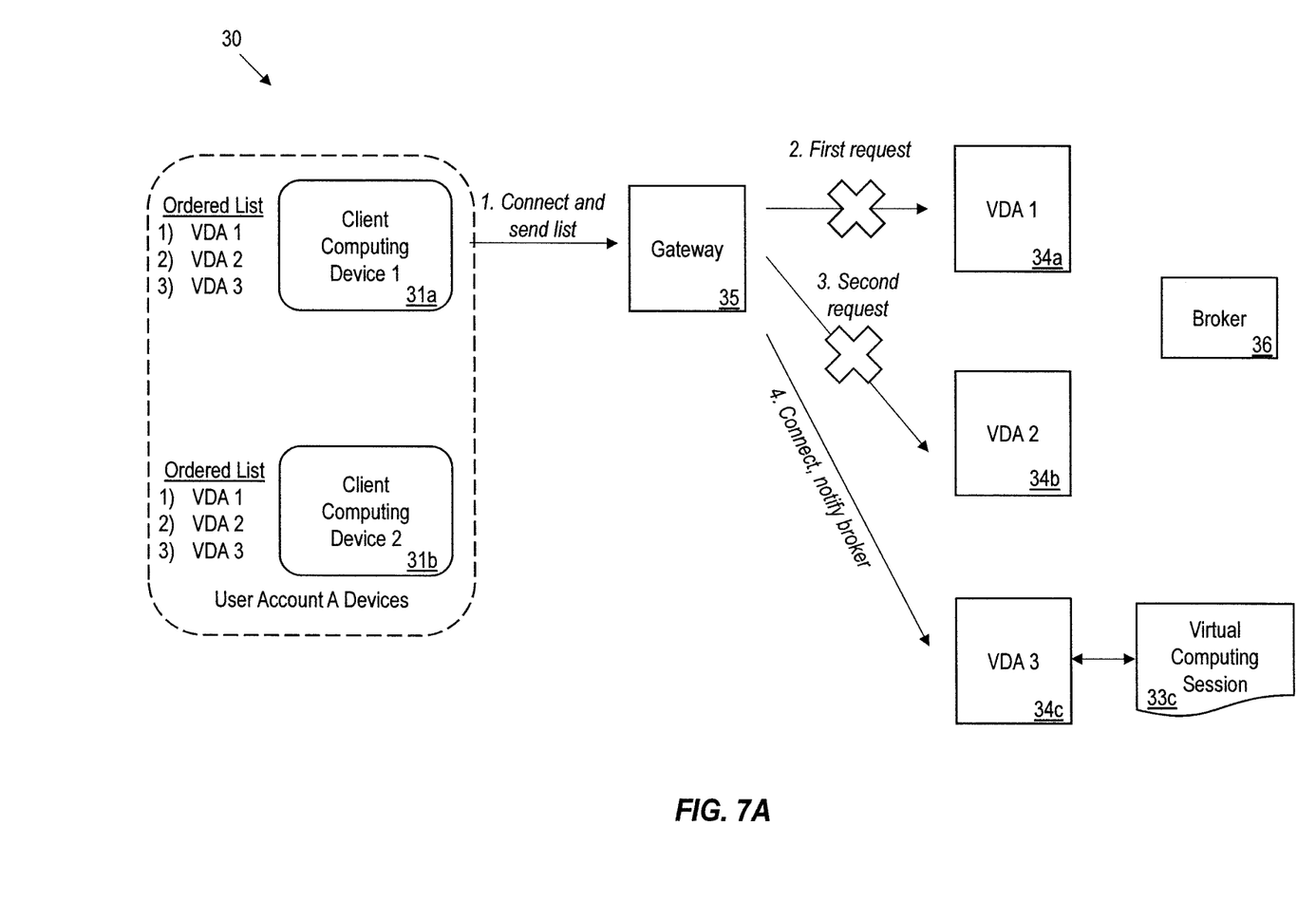
FIGS. 7A, 7B, and 8-9 are block diagrams illustrating virtual computing session connection aspects in accordance with a second example embodiment utilizing a gateway computing device and a broker of the system of FIG. 3.
Figure 7B:
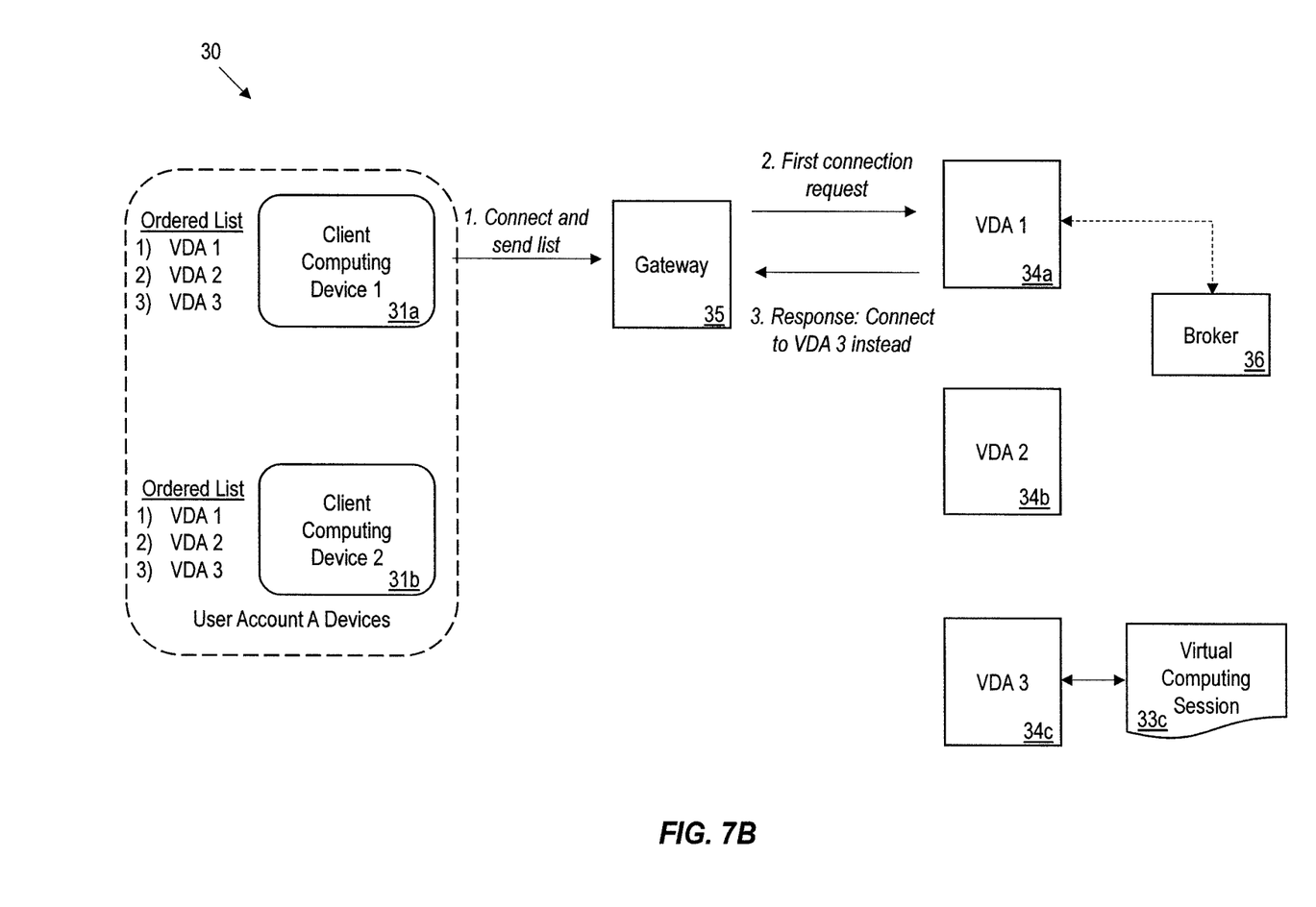
Figure 8:
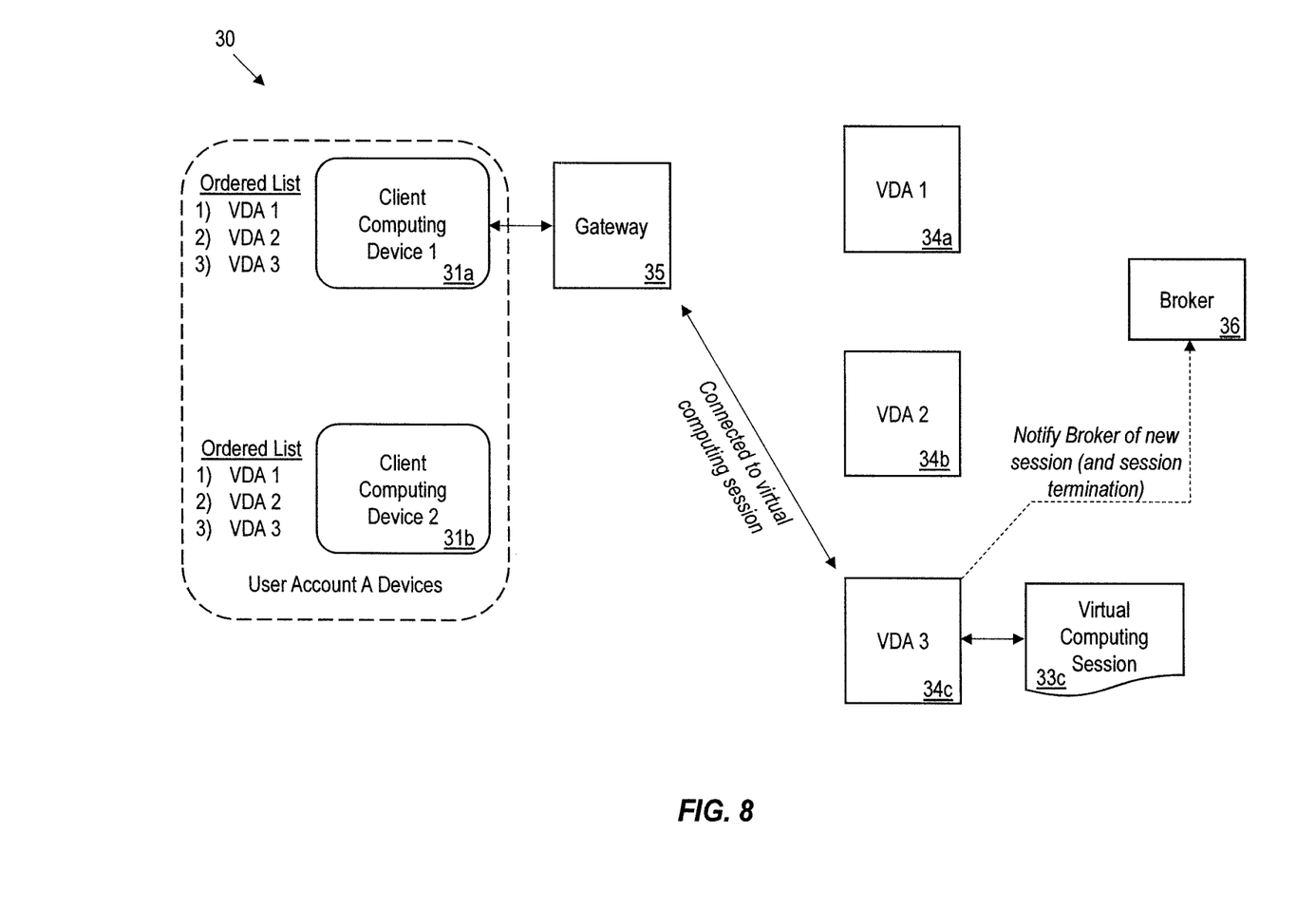
Figure 9:
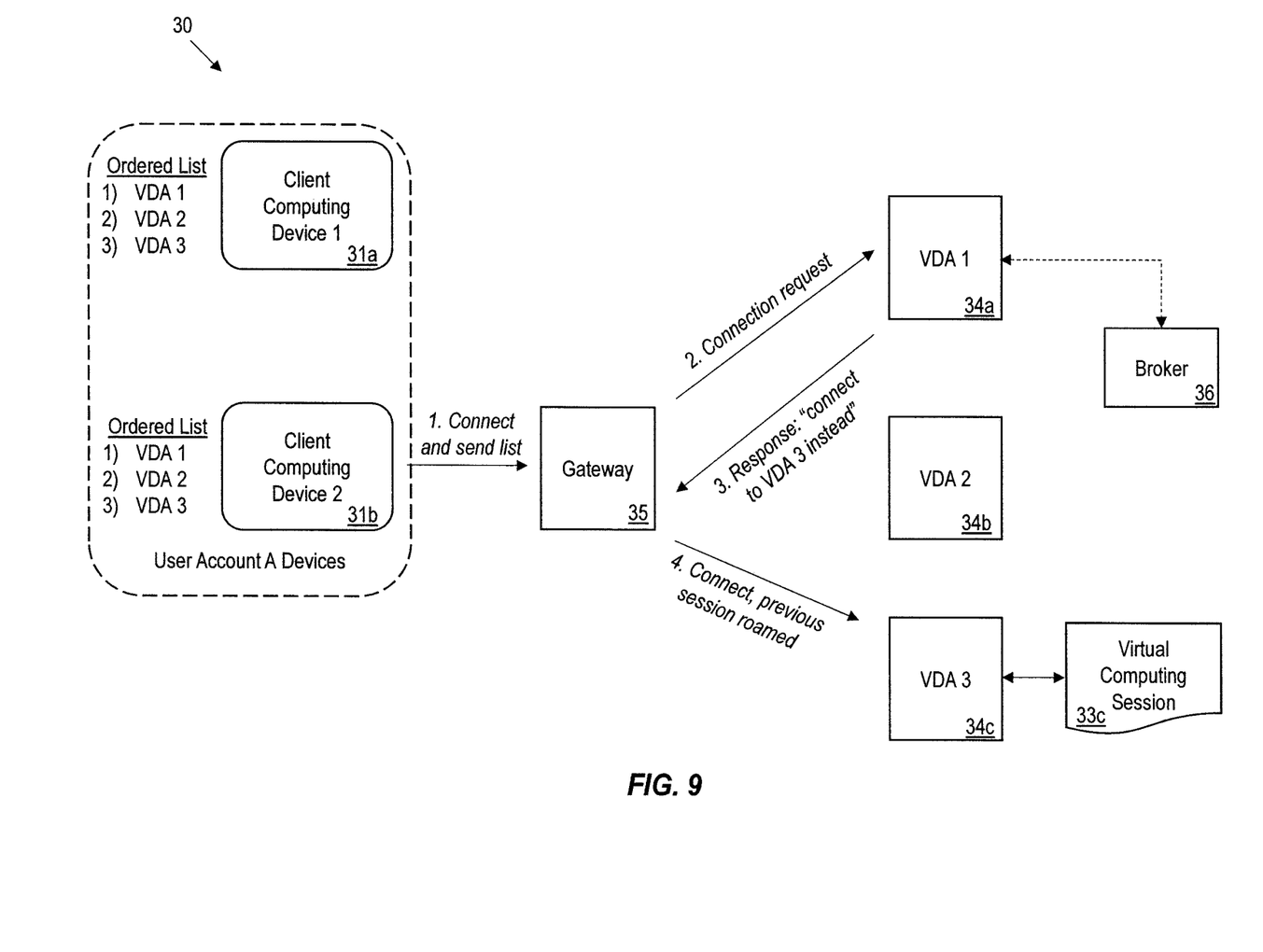

Turning now to another example embodiment illustrated in FIGS. 7-9, the client computing devices 31a, 31b may be connected to the VDAs 34a-34c via a gateway computing device 35. By way of example, the gateway computing device 35 may be implemented using Citrix NetScaler Gateway. Citrix NetScaler Gateway consolidates remote access infrastructure to provide single sign-on across all applications whether in a datacenter, in a cloud, or delivered as SaaS. It allows users to access different applications from different client computing devices through a single URL. It also provides secure proxy for connections to VDAs behind a firewall. However, other gateway configurations may be used in different implementations. The gateway computing device 35 may be implemented in the cloud or on premises in some embodiments.

Generally speaking, when gateway connections are used, for security reasons the client computing devices 31a, 31b are not made aware of internal details about the VDAs 34a-34c, such as the VDA IP address or port to connect to. Rather, the client computing devices 31a, 31b may only know the address of the gateway computing device 35 and, following authentication to the gateway and/or a store (e.g., Citrix STOREFRONT), they are provided with an authorization ticket, e.g. a Secure Ticket Authority (STA) ticket or a long-lived connection lease ticket that may be used for authorizing the connection via the gateway computing device. By way of background, a connection lease is a signed multi-use but limited-validity document. It replaces single use authorization tickets, and the validity of a connection lease may be customer-controlled and vary over a wide range of time (e.g., from seconds to weeks).

In the example gateway implementation, as part of a single combined connection lease, the client computing devices 31a, 31b receive an ordered list of VDAs (here again, the VDAs 34a-34c) to which they may connect. In an example implementation, the ordered list includes opaque VDA IDs, not exposing internal VDA details. The connection lease may also include an authorization ticket. In accordance with another example implementation, the client computing devices 31a, 31b may receive multiple ordered combined authorization tickets, e.g., STA or connection lease tickets, each with a VDA ID opaquely embedded into (or pointed to) by it. Independently, the gateway computing device 35 may receive a complete list of VDA ID to [VDA address, port] mappings. The list may be aggregate for all users, user agnostic, and may be provided by a central broker or cloud service, for example.

As seen in FIG. 7, the first client computing device 31a makes a connection to the gateway computing device 35, providing its combined connection lease or, assuming the alternative implementation above, the multiple ordered connection lease tickets. In VDA ID priority order, the gateway computing device 35 then authorizes the connection based on the single (or VDA-specific) ticket, extracts the VDA details [VDA address, port] and relays the connection to the respective VDA. Here again, if the VDA is down or rejects the connection because it is fully-loaded, then the gateway computing device 35 falls back to the next VDA in priority order. In this case, the gateway computing device 35 is unable to connect with either of the VDAs 34a, 34b, and instead ends up establishing a connection to a virtual computing session 33c through the VDA 34c. That is, the gateway computing device 35 completes the protocol handshake between the client computing device 31a and the VDA 34c. In one example implementation, this may be done using a tunneling protocol such as the Common Gateway Protocol (CGP) from Citrix Systems, as will be discussed further below, although various other suitable protocols (e.g., RDP, etc.) may also be used in different embodiments.

In another example embodiment, as shown in FIG. 7B, VDAs 34a-34c may communicate with a broker computing device (broker) 36 in order to determine whether and where to redirect a connection request. For example, upon receiving a connection request from the gateway computing device 35, VDA 34a may decide to reject the connection because of load. However, in this example, VDA 34a may contact the broker 36 to determine where the connection should be redirected to. If the broker 36 is available, it may respond with "Connect to VDA N instead". For example, the broker 36 may respond with instruction to redirect the connection to VDA 34c. VDA 34c may or may not be already included in the ordered list of VDAs in the combined connection lease or, assuming the alternative implementation above, the multiple ordered connection lease tickets. In addition, even when VDA 34c is already in the ordered list, it may not necessarily be the next one in order. The VDA 34a may then send a response back to the gateway computing device 35 instructing it to connect to VDA 34c instead. By way of example, the VDA 34a may send a CGP-finish message with a special reason code (e.g., "VDA fallback"), and provide the appropriate VDA ID (here for VDA 34c), or directly via the [VDA N address, port] to connect to. The gateway computing device 35 then terminates the transport connection to the VDA 34a, and makes a new connection to the VDA 34c in this example. All the while, the client computing device 31b which is now requesting the computing session is oblivious to the fact that it was re-directed to the VDA 34c. Thus, rather than trying the next VDA in order (VDA 34b in this example), the gateway 35 instead sends a connection request directly to VDA 34c. The advantage of this approach is that, when the broker is available, connection times may be shorter. Another advantage of this approach is that, when the broker is available, but all VDAs in the order list are either busy or unavailable, e.g. down, then if at least one VDA in the ordered list is available, i.e. it can be contacted, then a connection can still be established to a VDA outside of the ordered list. Continuing with the example CGP implementation, the CGP handshake from the client computing device 31a may continue, but it is now re-directed to the VDA 34c. In other words, the gateway computing device 35 sends a CGP bind-request to the VDA 34c, then a CGP bind-response from the VDA 34c is sent back to the gateway computing device and relayed back to the client computing device 31a to complete the handshake. Thus the gateway 35 ends up establishing a connection to a virtual computing session 33c through the VDA 34c while skipping VDA 34b.

In the example illustrated in FIG. 8, rather than utilizing a peer-to-peer connection between the VDAs 34a-34c to update session information between them, here the VDAs communicate via a broker computing device (broker) 36. The VDA 34c may accordingly notify the broker 36 upon establishing the virtual computing session 33c for the client computing device 31a, so that the VDAs 34a, 34b will have access to this information when necessary. One potential advantage of brokered communication between the VDAs 34a-34c is that it may require less updates by the VDA 34c, particularly when connections to the higher-order VDAs 34a, 34b are down, for example. The broker 36 may be implemented in the cloud or on premises in some embodiments. If the broker 36 is not available at the time, VDA 34c notifies all the higher-ranked VDAs 34a, 34b of the session it holds, e.g., via a peer-to-peer protocol, as previously discussed above and illustrated in FIG. 5. If VDA 34c is not in the ordered list, it is implicitly considered lower ranked than any other VDA in the ordered list, and is also considered to have the same rank as any other unknown VDA not in the ordered list. Therefore, if VDA 34c is not in the ordered list, advantageously, VDA 34c only has to notify VDAs already in the ordered list, that is, VDA 34c does not have to notify any VDAs outside of the ordered list.

If the VDA 34a initially accepts the transport connection but then responds with "Connect to VDA N instead", this means that the virtual computing session 33c has already been established elsewhere. In the example shown in FIG. 9, the virtual computing session was established through the VDA 34c (which the VDA 34a learns of through the broker 36), and the gateway computing device 35 is accordingly re-directed to this lower-order VDA. By way of example, the VDA 34a may send a CGP-finish message with a special reason code (e.g., "VDA fallback"), and provide the appropriate VDA ID (here for VDA 34c), or directly via the [VDA N address, port] to connect to. The gateway computing device 35 then terminates the transport connection to the VDA 34a, and makes a new connection to the VDA 34c in this example. All the while, the client computing device 31b which is now requesting the computing session is oblivious to the fact that it was re-directed to the VDA 34c. Continuing with the example CGP implementation, the CGP handshake from the client computing device 31b may continue, but it is now re-directed to the VDA 34c. In other words, the gateway computing device 35 sends a CGP bind-request to the VDA 34c, then a CGP bind-response from the VDA 34c is sent back to the gateway computing device and relayed back to the client computing device 31b to complete the handshake.

The client-to-VDA protocol may either be a standalone protocol before an Independent Computing Architecture (ICA) connection, or built as a message early in the ICA or CGP handshake to minimize the number of connections and improve user launch times. One example approach is to use the CGP protocol handshake, since it occurs before ICA and may advantageously minimize the number of roundtrips from the client to the VDA in the case of fallback to another VDA. Furthermore, in another example implementation the CGP handshake may be integrated with Citrix NetScaler Gateway and allow for the optimized method of fallback via a gateway as described above. The VDA to VDA protocol may be an application specific protocol, or it may leverage some form of shared storage (e.g., via Citrix ShareFile, Drobox, MS OneDrive, etc.) which may have a relatively high availability.

It should be noted that in some instances, a combination of direct and gateway connections may be used (i.e., a hybrid approach). That is, the client devices 31a, 31b may connect to one or more VDAs directly (as discussed with references to FIGS. 4-6 above), and to others via a gateway computing device 35. Similarly, in some implementations there may be multiple gateway computing devices 35 which are used to establish connections with different VDAs 31a-31n. It should also be noted that the use of peer-to-peer connection between the VDAs 34a-34c to update session information between them, as illustrated in FIGS. 4-6 above, could also apply to instances of gateway connections. Similarly, the use of a broker computing device (broker) 36, as illustrated in FIGS. 7-9 above, could also apply to instances of direct connections.

Various approaches may be used for assigning an ordered list of VDAs to a user account. For example, the list may be in a preferred order of connection to the available VDAs in terms of performance. Another example is to divide them up equally, e.g., for three available VDAs, the first ⅓ of users get an ordered list 1-2-3, the next third gets an ordered list 2-3-1, and the last third gets an ordered list 3-1-2). Other approaches may include pseudorandom selection, ordering based upon geographical proximity, etc. In an example implementation, the ordered list may be implemented in a connection which include less than all (i.e., a subset) of the VDAs that a client computing device could possibly connect to. Other approaches may include the client computing device 31a or 31b reordering the list based on most frequently or most recently used (connected to) VDAs per user. When a gateway connection is used (as discussed with references to FIGS. 7-9 above), the Gateway 35 may send opaque VDA ID back to the client computing device 31a or 31b to indicate successful connection establishment to a specific VDA in the order list, thus advantageously allowing the client computing device to reorder the list. The reordered list may be shared with other endpoint devices associated with the same user account, for example, using roaming profiles or some form of shared storage (e.g., via Citrix ShareFile, Drobox, MS OneDrive, etc.) which may have a relatively high availability.

The above-described approaches advantageously help overcome a significant technical challenge, namely roaming a session from one client device to another without the overhead and potential downtime associated with typical approaches utilizing a store front and a broker in the middle between the client devices and VDAs. That is, by allowing roaming of a user's session using a peer-to-peer VDA protocol, for example, instead of a centralized broker, session roaming may continue to work without dependency on broker or individual VDA availability. This may also advantageously lead to less instances of degraded sessions, i.e., where a new session is established despite a prior session already running elsewhere.

Another advantage of the above-described approaches is that only minimal information needs to be replicated amongst the VDAs. That is, the VDAs only needs to notify other VDAs in the list that are higher in order of existing sessions, and each VDA only needs to keep track of pertinent lower-order sessions (rather than all active session). As a result, this may advantageously help keep the VDA logic relatively simple, without shifting a relatively complicated broker configuration to the VDAs.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computer system comprising:
a plurality of client computing devices; and
a plurality of virtual delivery agents (VDAs) configured to connect the client computing devices with virtual computing sessions provided by a plurality of host computing devices;
wherein the client computing devices are configured to request virtual computing sessions from the VDAs using respective connection leases including an ordered list of VDAs, and when requesting a new virtual computing session, each client computing device sending a new session request to a first VDA in the ordered list of its connection lease and, if unable to connect to a virtual computing session through the first VDA, continuing to request a new session from each of the remaining VDAs in the list in descending order until receiving a connection with a new virtual computing session;

wherein the VDAs are configured to re-direct new session requests from the client computing devices to a lower VDA in the ordered list when existing virtual computing sessions for the client computing devices are already active with the host computing device associated with the lower VDA;

wherein at least some of the client computing devices have different ordered lists of VDAs.

2. The computer system of claim 1 wherein each client computing device has a respective user account associated therewith; and wherein client computing devices having a same user account associated therewith share a same ordered list of the VDAs in their connection leases.

3. The computer system of claim 1 wherein each VDA is configured to notify VDAs higher in the ordered list for a given client computing device upon connecting the given client computing device with a virtual computing session.

4. The computer system of claim 3 wherein each VDA is further configured to notify VDAs higher in the ordered list for a given client computing device upon closing of a virtual computing session with the given client computing device.

5. The computer system of claim 1 further comprising a gateway computing device configured to receive requests for virtual computing sessions from the client computing devices, and communicate with the VDAs to establish virtual computing sessions for the client computing devices in accordance with the ordered list lists.

6. The computer system of claim 5 wherein the client computing devices are configured to provide the ordered list lists to the gateway computing device.

7. The computer system of claim 5 wherein the gateway computing device is further configured to re-direct new session requests from a given client computing device to a lower VDA in the ordered list for the given client computing device when an existing virtual computing session is already active with the host computing device associated with the lower VDA and without notifying the given client computing device of the re-direct.

8. The computer system of claim 1 further comprising a broker computing device cooperating with the VDAs to track active virtual computing sessions between the host computing devices and the client computing devices.

9. The computer system of claim 1 further comprising a broker computing device cooperating with the VDAs to re-direct new session requests from a given client computing device to another VDA inside or outside of the ordered list for the given client computing device when a connected-to VDA is unable to connect the given client computing device with a virtual computing session.

10. The computer system of claim 1 wherein the virtual computing sessions comprise at least one of virtual desktop sessions and virtual application sessions.

11. A client computing device comprising:
a memory and a processor cooperating with the memory to request virtual computing sessions from a plurality of virtual delivery agents (VDAs) configured to connect the client computing device with virtual computing sessions based upon a connection lease including an ordered list of VDAs assigned to the client computing device, the processor requesting virtual sessions by
sending a new virtual computing session request to a first VDA in the ordered list, and
if unable to connect to a virtual computing session through the first VDA, continuing to request a new virtual computing session from each of the remaining VDAs in the list in descending order until receiving a connection with a new virtual computing session;
wherein the ordered list of VDAs assigned to the client computing device is different than ordered lists of VDAs for other client computing devices requesting virtual computing sessions from the virtual delivery agents (VDAs).

12. The client computing device of claim 11 wherein the client computing device is associated with a user account and shares a same ordered list of the VDAs in its connection lease with another client computing device associated with the user account.

13. The client computing device of claim 11 wherein the processor is further configured to send the new virtual computing session requests to the VDAs through a gateway computing device.

14. The client computing device of claim 13 wherein the processor is further configured to provide the ordered list to the gateway computing device.

15. The client computing device of claim 11 wherein the virtual computing sessions comprise at least one of virtual desktop sessions and virtual application sessions.

16. A method comprising:
at a client computing device, requesting virtual computing sessions from a plurality of virtual delivery agents (VDAs) configured to connect the client computing device with virtual computing sessions based upon a connection lease including an ordered list of VDAs assigned to the client computing device by
sending a new virtual computing session request to a first VDA in the ordered list, and
if unable to connect to a virtual computing session through the first VDA, continuing to request a new virtual computing session from each of the remaining VDAs in the list in descending order until receiving a connection with a new virtual computing session;
wherein the ordered list of VDAs assigned to the client computing device is different than ordered lists of VDAs for other client computing devices requesting virtual computing sessions from the virtual delivery agents (VDAs).

17. The method of claim 16 wherein the client computing device is associated with a user account and shares a same ordered list of the VDAs in its connection lease with another client computing device associated with the user account.

18. The method of claim 16 wherein requesting further comprises sending the new virtual computing session requests to the VDAs through a gateway computing device.

19. The method of claim 18 further comprising providing the ordered list from the client device to the gateway computing device.

20. The method of claim 16 wherein the virtual computing sessions comprise at least one of virtual desktop sessions and virtual application sessions.

* * * * *